United States Patent
Isaacs et al.

(10) Patent No.: US 9,525,716 B2
(45) Date of Patent: Dec. 20, 2016

(54) ENSURING AVAILABILITY AND PARAMETER FORMAT OF URL SCHEME COMMANDS

(75) Inventors: James Isaacs, San Mateo, CA (US); Andrew Hedges, Burlingame, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1224 days.

(21) Appl. No.: 13/406,164

(22) Filed: Feb. 27, 2012

(65) Prior Publication Data

US 2013/0226991 A1 Aug. 29, 2013

(51) Int. Cl.
- *G06F 15/16* (2006.01)
- *H04L 29/08* (2006.01)
- *H04L 29/06* (2006.01)
- *G06F 17/30* (2006.01)

(52) U.S. Cl.
CPC ......... *H04L 67/02* (2013.01); *G06F 17/30887* (2013.01); *H04L 69/03* (2013.01)

(58) Field of Classification Search
CPC . H04L 29/08072; H04L 29/06; H04L 29/0809
USPC ....................................................... 709/203
See application file for complete search history.

(56) References Cited

U.S. PATENT DOCUMENTS

| 7,469,140 B1* | 12/2008 | Papineau ................ 455/418 |
| 2002/0143941 A1* | 10/2002 | Rich et al. ................ 709/225 |
| 2013/0212146 A1* | 8/2013 | Hansknecht ............... 709/201 |

OTHER PUBLICATIONS iPhone Development 101, Objective-C: Custom URL Schemes, a web blog post retrieved from http://www.idev101.com/code/Objective-C/custom_url_schemes.html, Oct. 27, 2009.*

* cited by examiner

*Primary Examiner* — Nicholas Taylor
*Assistant Examiner* — Chong G Kim
(74) *Attorney, Agent, or Firm* — Patterson + Sheridan LLP

(57) ABSTRACT

Techniques for rendering a webview in a host application are described. A webview in a host application is identified, the webview including at least one function call to a first function. Additionally, one or more application-specific URL values corresponding to a URL command scheme for the host application are identified. A URL scheme object is populated with the identified one or more application-specific URL values, the populated URL scheme object including a function definition for the first function that is associated with a first one of the one or more application-specific URL values. The populated URL scheme object is then inserted into the identified webview, such that when the webview is rendered and one of the at least one function calls is made, the function definition in the inserted URL scheme object is executed to transmit a request to an address portion of the first application-specific URL value.

21 Claims, 6 Drawing Sheets

ENSURING AVAILABILITY AND PARAMETER FORMAT OF URL SCHEME COMMANDS

BACKGROUND

Field of the Invention

Embodiments presented in this disclosure generally relate to object-oriented programming and, more particularly, to a universal URL scheme object for use across a plurality of host applications.

Description of the Related Art

Generally speaking, a Uniform Resource Locator ("URL") is a character string that identifies a network resource. Such a URL generally includes a scheme name, followed by a colon, two slashes, and then one or more parameters depending on the scheme under which the URL is composed. For example, a Hypertext Transfer Protocol ("HTTP") URL could include the scheme name of "http", followed by a colon, two slashes, and then the address (i.e., hostname, domain name, port information, etc.) of the network resource. Such a URL could be used, for instance, to request a specific network resource from a remote web server. As another example, a File Transfer Protocol ("FTP") URL could include the scheme name of "ftp", followed by a colon, two slashes, and then address information of the network resource (e.g., a FTP server). Such a URL could be used to establish an FTP session to an FTP server.

In addition to identifying a network resource, URLs may also be used to pass data to the network resource. For instance, a particular URL could include a question mark character, followed by one or more parameter names and parameter values, separated by an ampersand. For example, such a URL could be "http://localhost/example.aspx?param1=A&param2=B", where the parameter "param1" is assigned the value of "A" and the parameter "param2" is assigned the value of "B". Such a URL could be used, for instance, to request a specific network resource from a remote web server and to pass particular parameters to the specific network resource. As another example, a URL composed according to a second scheme could specify a command and then one or more parameters separated by forward slashes, in a manner that's analogous to a function call. For example, such a URL could be "tt4cmd://command/param1/param2", where the string "command" represents the command being invoked, and the strings "param1" and "param2" represent parameters being passed to the command.

SUMMARY

Embodiments described herein provide a method, system and computer program product for rendering a webview in a host application. The method, system and computer program product identify a webview to be displayed in a host application is identified, the webview including at least one function call to a first function. The method, system and computer program product also identify one or more application-specific URL values corresponding to a URL command scheme for the host application. Additionally, the method, system and computer program product populate a URL scheme object with the identified one or more application-specific URL values, the populated URL scheme object including a function definition for the first function that is associated with a first one of the one or more application-specific URL values. The method, system and computer program product further insert the populated URL scheme object into the identified webview, such that when the webview is rendered and one of the at least one function calls is made, the function definition in the inserted URL scheme object is executed to transmit a request to an address portion of the first application-specific URL value.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally speaking, each application may define its own URL scheme commands. Furthermore, even though a URL scheme command for a first application may have the same command name as a URL scheme command for a second application, these two URL scheme commands may accept different parameters. As such, a developer of a webview that is configured to operate with a variety of different applications generally needs to learn and account for the various URL scheme commands used by each of the different applications and the parameters that each of these URL scheme commands accepts. However, such a task is oftentimes a manual process in which the developer consults the documentation for each of the different applications and may even need to consult directly with the developers of the various applications.

Furthermore, the development of the webview may be complicated if the webview needs to be able to interact with different applications, each with different commands and command parameters. As used herein, a webview generally refers to any web content capable of being rendered by a web browser or a web browser component within a software application. Additionally, such a webview may include text formatted using a markup language, source code or a combination therebetween. For example, a particular webview could be a Hypertext Markup Language ("HTML") page received from a web server and rendered for display to a user using a web browser. Additionally, certain software applications may include a web browser component within the application that is capable of rendering a webview (e.g., for display within the software application). In such an application, the rendered webview may be used for various purposes, including providing a user interface within the application and displaying advertisements within the application. Additionally, the software application may render a webview in one or more background windows, such that the webview is not displayed to the user but is still being rendered within the software application. Such an approach may be useful, for example, when the webview contains one or more callback functions which the software application may access.

Figure 1B:
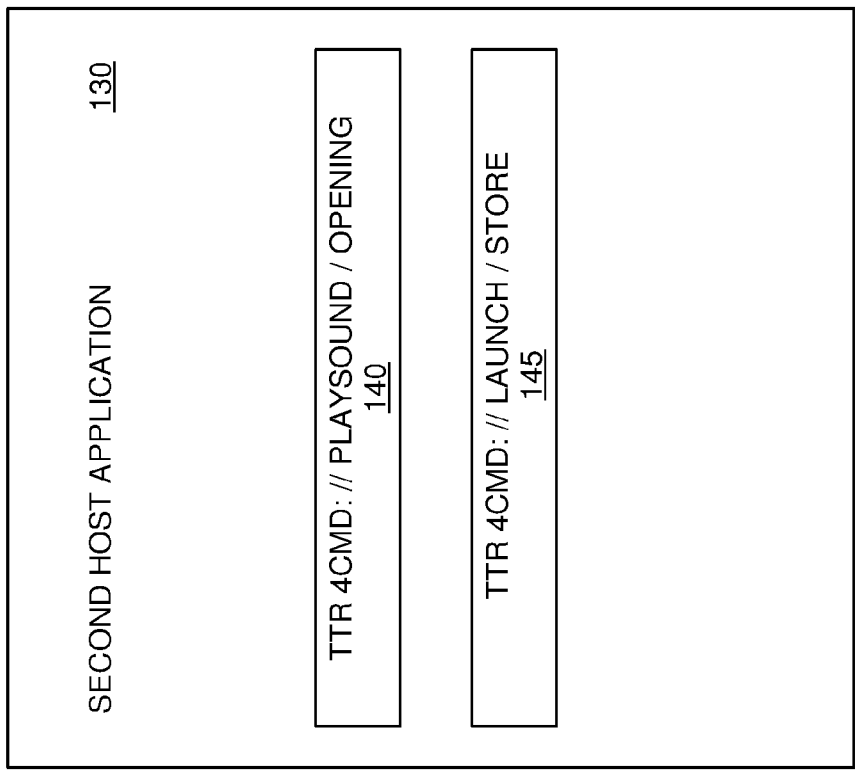
FIGS. 1A-B are block diagrams illustrating host applications, according to various embodiments described herein.
Figure 1A:
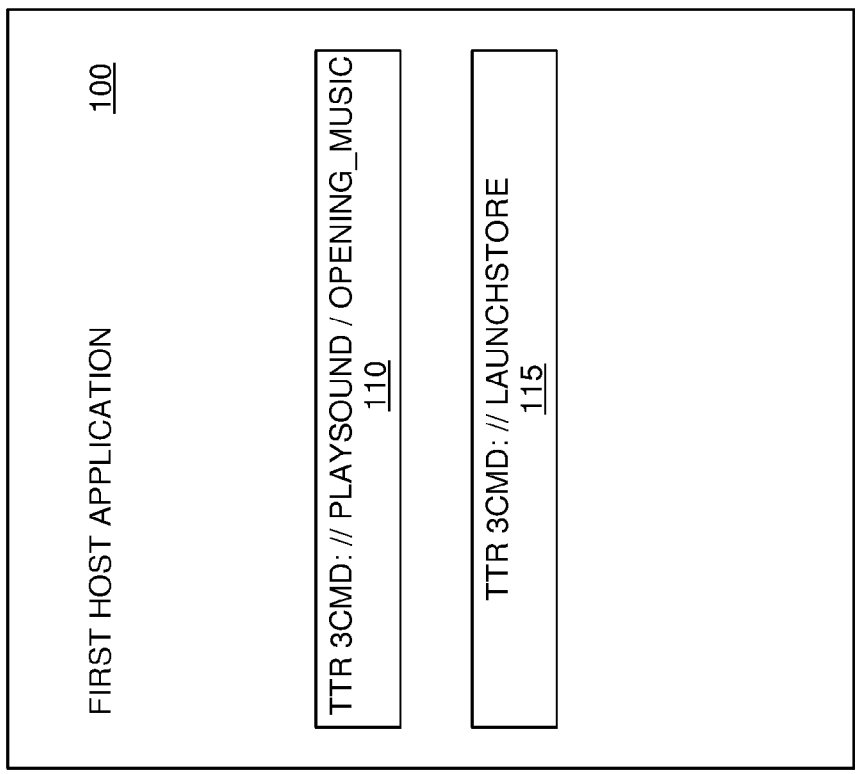

An example of such applications is shown in FIGS. 1A-B, which are block diagrams illustrating host applications, according to various embodiments described herein. As shown in FIG. 1A, the first application 100 is configured to accept a first URL scheme command 110 that plays the opening music for the application and a second URL scheme command 115 that launches an in-game store within the application 100. Similarly, in FIG. 1B, the second application 130 is configured to accept a first URL scheme command 140 that plays the opening music for the second application and a second URL scheme command 145 that launches an in-game store within the second application 130. Here, the first host application 100 uses the URL scheme name of "TTR3CMD" while the second host application 130 uses a different URL scheme name of "TTR4CMD." As such, although the URL scheme commands 110 and 140 perform equivalent functions within their respective applications 100 and 130, these URL scheme commands accept different parameter values (i.e., "OPENING_MUSIC" versus "OPENING") in order to play the opening music within the respective applications 100 and 130. Additionally, although the URL scheme commands 115 and 145 both launch the in-game store within their respective applications 100 and 130, these URL scheme commands use different commands (i.e., "LAUNCH-STORE" versus "LAUNCH") in order to perform the same task within the respective application 100 and 130. Furthermore, the command 115 is not configured to accept any parameters in order to perform its task, while the command 145 is configured to accept the parameter value of "STORE" in order to perform its task.

As such, a developer that is creating a webview configured to interact with both the first host application 100 and the second host application 130 would need to account for the variations in URL scheme commands across the two applications 100 and 130 and to manually account for these variations in the webview. If the developer is not intimately familiar with each of the applications 100 and 130, the developer would then need to consult with written documentation or with other developers (e.g., the developers of each of the applications 100 and 130) in order to learn the different URL schemes used by each of the applications. This can oftentimes be a manual and time consuming process. Furthermore, the development of the webview may be more difficult as a result as well, as the webview needs to identify and account for each of the different applications 100 and 130. These inefficiencies and difficulties are substantially compounded when the webview needs to be configured to interact with a substantial number of different host applications.

Furthermore, the developer of a webview may have no way of determining, within the webview itself, which URL scheme commands are accepted by a particular host application rendering the webview. For example, assume that the first host application 100 is configured to only accept the URL scheme commands 110 and 115. If a webview rendered by the first host application 100 were to issue a request to the URL scheme command "TTR3CMD://PLAYSOUND/ENDING" (i.e., a URL using the scheme name handled by the host application 100 but to an address not recognized by the application 100), the webview may have no or limited ways of knowing whether this request was completed. As a result, this may cause errors within the host application or may simply cause the webview to behave in an unintended manner.

Figure 2:
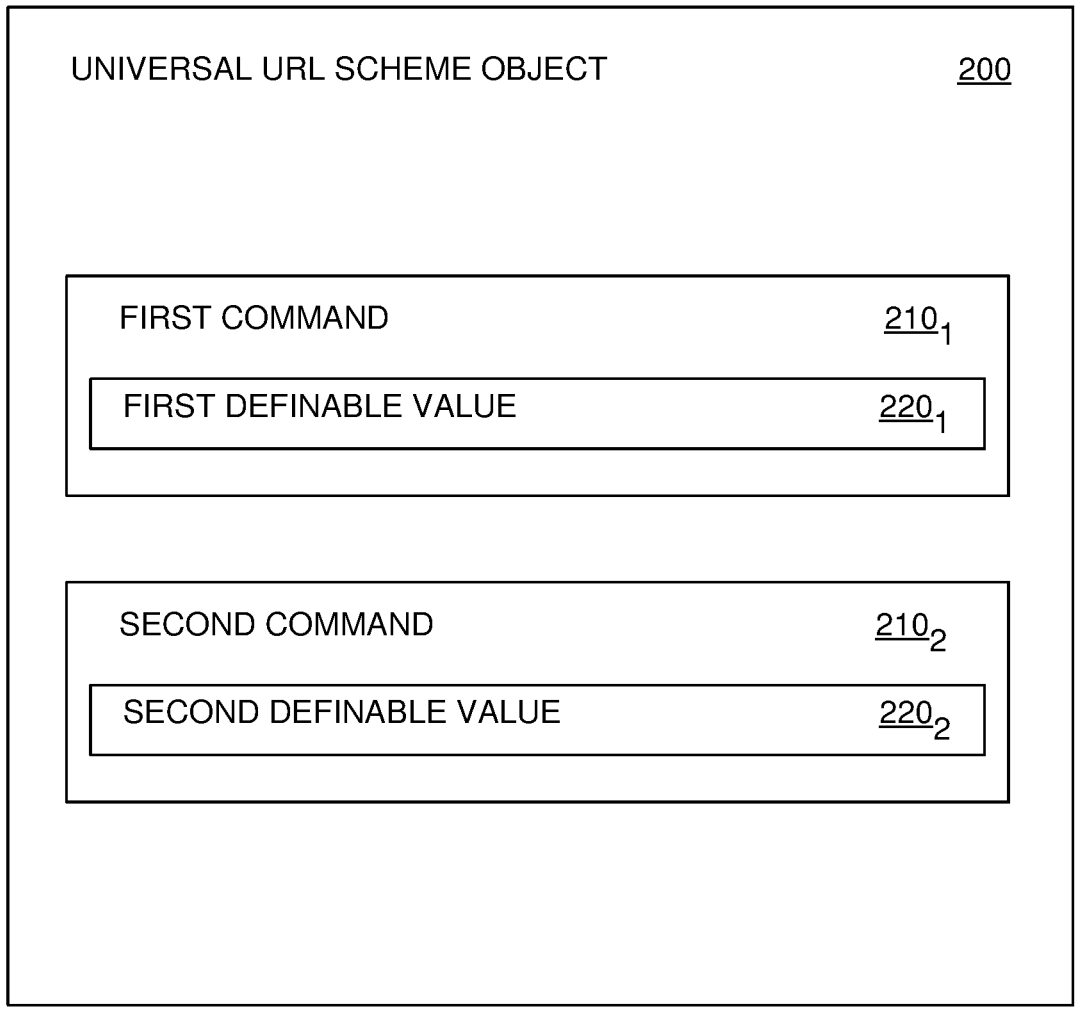
FIG. 2 is a block diagram illustrating a universal URL scheme object, according to one embodiment described herein.

As such, embodiments described herein provide techniques for using a universal URL scheme object with a webview across a plurality of applications. An example of such an object is shown in FIG. 2, which is a block diagram illustrating a universal URL scheme object, according to one embodiment described herein. As shown, the depicted universal URL scheme object 200 includes commands 210, with each command including a definable value 220. Of note, although only two commands $210_{1-2}$ are shown, such a depiction is for illustrative purposes only and is without limitation. More generally, universal URL scheme objects can contain any number of commands, each with a respective definable value, according to various embodiments described herein.

Generally, each of the host applications can be configured with a URL scheme management component that is configured to populate a respective universal URL scheme object with application-specific values and to insert the populated object into the webview before the webview is rendered by the respective host application. In one embodiment, the universal URL scheme object 200 is implemented as JavaScript code, with each of the commands $210_{1-2}$ implemented as a separate function and the definable values $220_{1-2}$ implemented as string values within the code. For instance, the URL scheme management component could populate the first definable values $220_{1-2}$ with the appropriate URL scheme command for the respective application. The webview may further be configured to reference function calls of the populated object (e.g., commands $210_{1-2}$), rather than the URL scheme commands of the host application. In response to the function call, these commands 210 of the populated universal scheme object 200 may, in turn, use the populated values $220_{1-2}$ to issue the appropriate URL scheme command to the respective application.

Figure 3B:
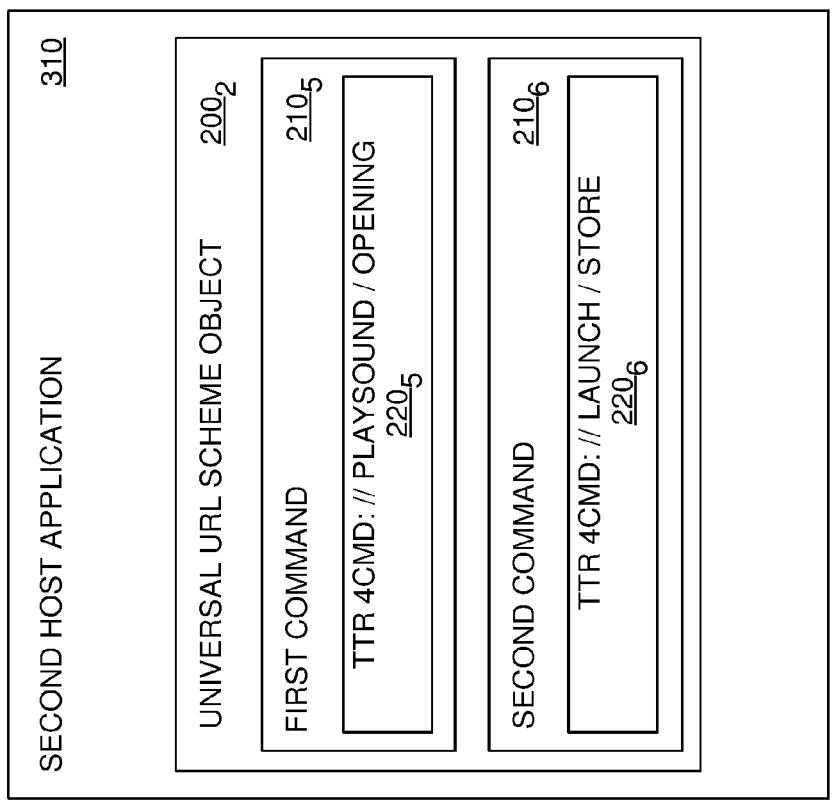
FIGS. 3A-B are block diagrams illustrating host applications configured with universal URL scheme objects, according to embodiments described herein.
Figure 3A:
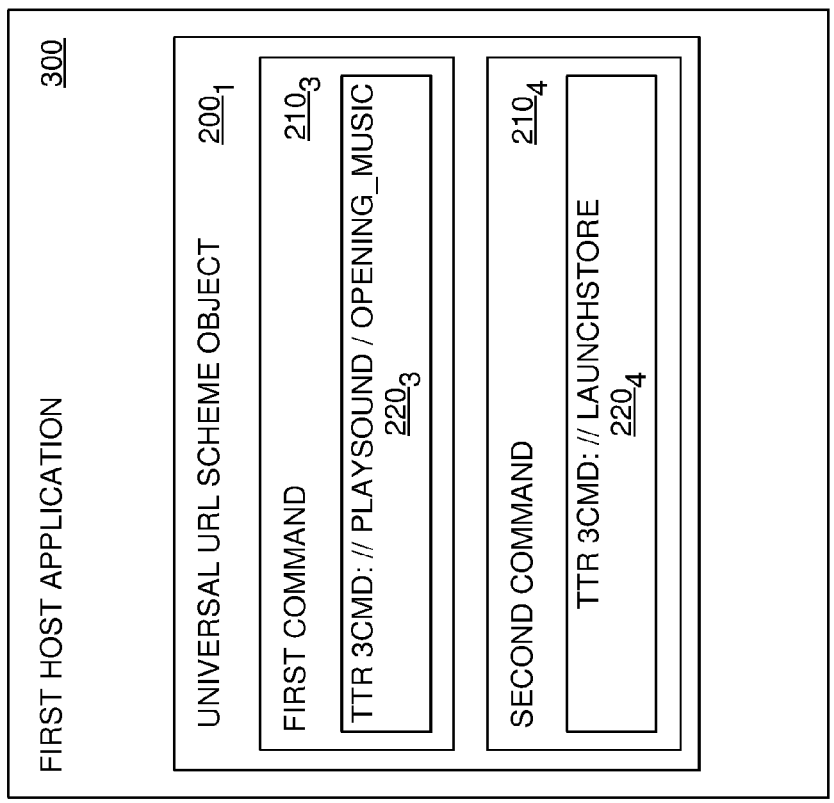

An example of this is shown in FIGS. 3A-B, which are block diagrams illustrating host applications configured with universal URL scheme objects, according to embodiments described herein. As shown in FIG. 3A, the first host application 300 includes a populated universal URL scheme object $200_1$, where the first command $210_3$ (e.g., a function within the object) has been populated by the URL scheme management component with data corresponding to the URL command scheme used by the first host application 300. Thus, in the depicted embodiment, the URL scheme management component has populated the first command $210_3$ with the string "TTR3CMD://PLAYSOUND/OPENING_MUSIC", which corresponds to the URL scheme command 110 used by the first host application and depicted above in FIG. 1A. Likewise, the second command $210_4$ has been populated by the URL scheme management component with the string "TTR3CMD://LAUNCHSTORE", which corresponds to the URL scheme command 115.

Upon receiving a webview configured to interact with universal URL scheme objects, the URL scheme management component for the first host application 300 could insert the populated universal URL scheme objection $200_1$ into the webview before rendering the webview for display. The webview can then reference the commands $210_{3-4}$, which in turn reference the appropriate URL scheme command for the first host application 300.

Likewise, the second host application 310 depicted in FIG. 3B includes a populated universal URL scheme object $200_2$, which the URL scheme management component has populated with different values corresponding to the URL command scheme used by the second application 310. Thus, here, the URL scheme management component has populated the first command $210_5$ with data corresponding to the URL command scheme used by the second host application 310. Accordingly, here the URL scheme management component has populated the first command $210_5$ with the string "TTR4CMD://PLAYSOUND/OPENING" $220_5$, corresponding to the URL scheme command 140 used in the second host application 130 and depicted in FIG. 1B. Likewise, the URL scheme management component has populated the command $210_6$ with the string "TTR4CMD://LAUNCH/STORE", which corresponds to the URL scheme command 145 used in the second host application 130 and depicted in FIG. 1B.

In one aspect, by populating and inserting the universal URL scheme objects $200_{1-2}$ into the webviews that will be rendered by the application 300 and 310, embodiments enable the development of webviews without the requirement of any application-specific knowledge on behalf of the webview developer. That is, the webview may be configured to interact with the universal URL scheme object, and then a URL scheme management component for a particular application rendering the webview can insert a universal URL scheme object populated with application-specific URL command scheme data for the particular application into the webview, before the webview is rendered by the particular application. Advantageously, doing so simplifies the development of the webview, as the webview developer does not need to know or account for application-specific URL command scheme information in creating the webview.

Additionally, changes to the URL command scheme used by a particular application rendering the webview do not necessitate modifications to the webview. That is, because the webview does not require any application-specific URL command scheme information, but rather references generic information relating to the universal URL scheme object, the webview can remain constant despite modifications to the URL command scheme used by a particular application. Rather, in the event that the URL command scheme for the particular application is changed, the URL scheme management component for the particular application can merely populate the universal URL scheme object with different definable values corresponding to the updated URL command scheme for the application and can insert the newly populated object into the webview. Advantageously, doing so allows for modifications to the URL command scheme for an application to be handled without requiring any changes to the webview.

Furthermore, while a webview could be configured to interact with a plurality of host applications, in one embodiment the webview is configured for use with a specific host application. In such an embodiment, the universal URL scheme object can be used in order to expose the interface between the specific host application and its webviews. In such an embodiment, the webview may be configured specifically to interact with the host application in that the webview is configured to interact with the interface of the host application URL scheme object. However, the webview does not need to be configured to specifically interact with the URL command scheme used by the host application.

For example, assume that the universal URL scheme objects $200_{1-2}$ shown in FIG. 3A-B are defined using the object name "game" within their respective host applications 300 and 310. Here, assume that the object $200_1$ is configured to be called with the syntax of "game.cmd.launchstore( )", while the object $200_2$ is configured to be called with the syntax of "game.cmd.launch('store')". Thus, a webview configured to be displayed within the application 300 could use the application-specific syntax of "game.cmd.launchstore( )" in order to launch the in-game store within the application 300. However, the developer of the webview does not need to interact with or even have knowledge of the specific URL command scheme used by the application. For instance, the developer does not need to know that the application 300 is configured to accept URLs with the scheme name of "TTR3CMD", but rather only needs to know how to interact with the universal URL scheme object $200_1$ used by the application 300, thereby reducing the developer's burden of knowledge for developing the webview and making the webview development an easier and more efficient process.

Additionally, as discussed above, a webview issuing a request directly to a URL may have little or no mechanism for determining whether the issued request was successfully handled. For example, if a webview being rendered by a first host application issues a request to a URL having a scheme named handled by the first host application but to an address (and/or with one or more parameters) not recognized by the first host application, the first host application may take no action whatsoever in response to the request or could trigger an error in response to the request. In such a scenario, while it would be advantageous for the webview to detect the first host application does not recognize the URL before issuing the request to the URL, such detection is typically not possible when the webview issues the request directly to the URL.

On the other hand, in accordance with embodiments described herein, the webview can be configured to detect whether a particular function is implemented by the universal URL scheme object 200 and to only issue a call to the particular function if it has been defined. As a result, doing so enables the webview to more cleanly handle the case where a particular URL command is not implemented by the host application. That is, rather than issuing a request to the URL with little or no way of determining whether the request was successful, the webview may confirm whether the function corresponding to the URL is implemented within the universal URL scheme object 200 and may call the function only upon confirming that the function has indeed been implemented. Advantageously, doing so minimizes any errors or unintended behavior from the host application resulting from a request to an unrecognized URL.

Figure 4:
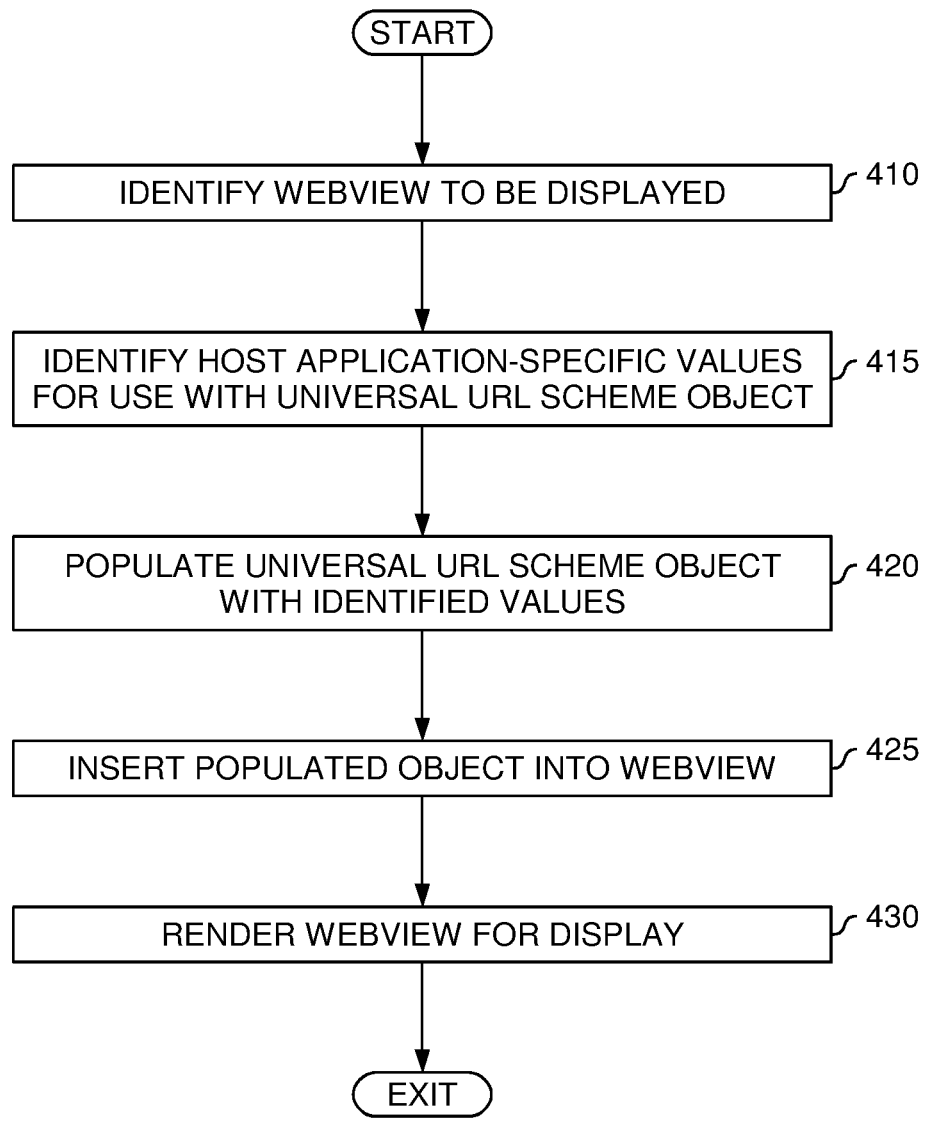
FIG. 4 is a block diagram illustrating a method for rendering a webview, according to one embodiment described herein.

FIG. 4 is a block diagram illustrating a method for rendering a webview, according to one embodiment described herein. As shown, the method 400 begins at step 410, where the URL scheme management component identifies a webview to be displayed. For instance, the webview could be retrieved from a storage location (e.g., a local hard disk on the computer system executing the host application). In one embodiment, the webview could be received from a remote server, such as a web server. More generally, it is broadly contemplated that the webview may be received or retrieved in any fashion in accordance with embodiments described herein.

The URL scheme management component identifies one or more host application-specific values for use with the universal URL scheme object (step 415). Generally, the identified application-specific values correspond to the commands used in the URL command scheme used by the host application. For instance, each of the application-specific values could correspond to a separate URL scheme command used by the host application. The URL scheme management component then populates the universal URL scheme object with the identified values (step 420). As an example, the URL scheme management component could insert string values into the universal URL scheme object, the string values corresponding to each URL scheme command used by the host application rendering the webview. The URL scheme management component then renders the webview including the populated object for display (step 430) and the method 400 ends.

As an example, assume that the host application uses the URL command "ttr4cmd://launch_store" in order to launch a graphical interface for an in-game store. In such an example, the URL scheme management component could populate a command within the universal URL scheme object that is associated with launching the in-game store with the string "ttr4cmd://launch_store", and the universal URL scheme object could be configured to submit a request to URL specified in the string whenever the command is executed by the webview. Advantageously, doing so allows for the webview to be developed using generic function calls to the universal URL scheme object, rather than requiring application-specific information for each and every application using the webview. This, in turn, simplifies the development of the webview and allows the webview to more easily interact with a substantial number of host applications.

In a particular embodiment, the webview may provide one or more callback operations that can be called by the host application. As an example, the webview could be configured with a first callback operation as part of the universal URL scheme object for use when a transaction was approved in an in-game store and a second callback operation for use when a transaction was declined in the in-game store. In such an example, the URL scheme management component could be configured to insert the universal URL scheme object into the webview without overwriting the callback operations in the webview.

Figure 5:
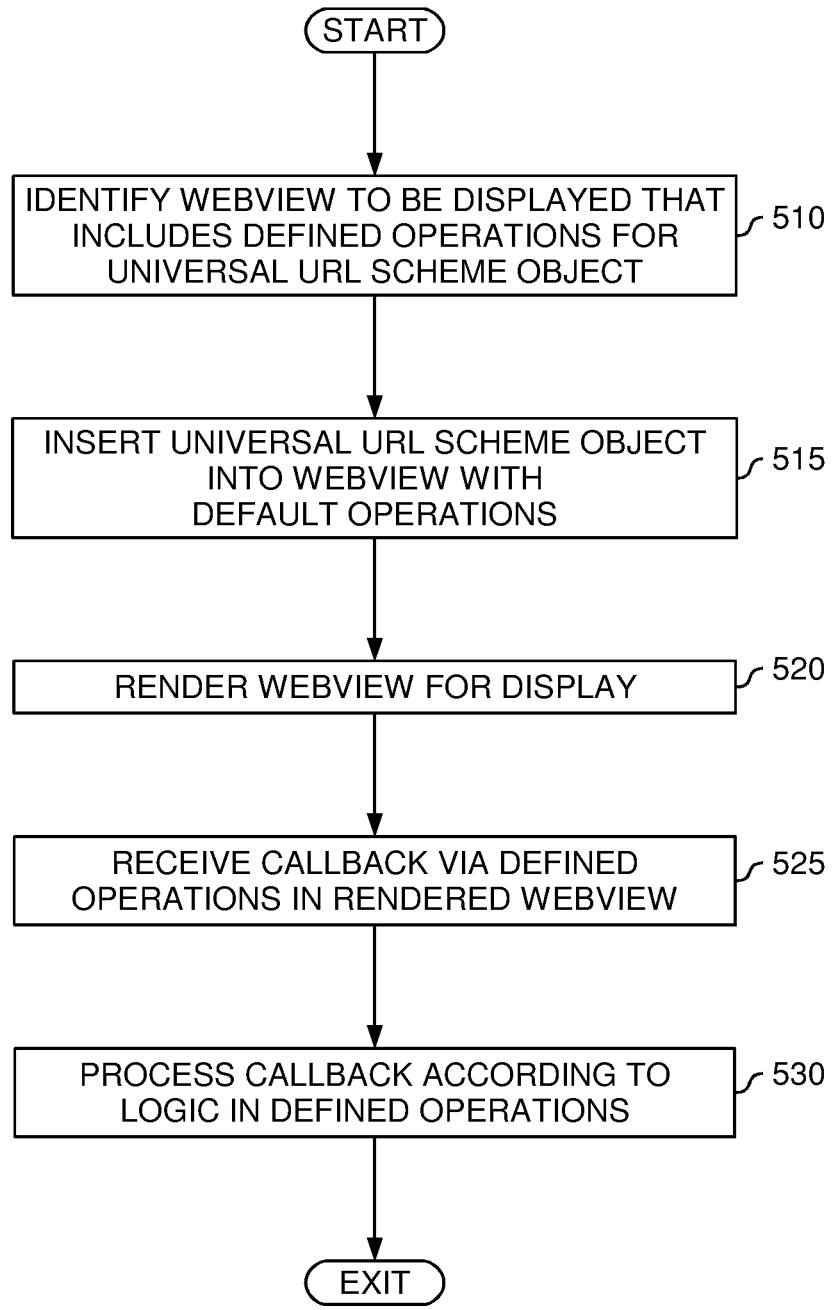
FIG. 5 is a block diagram illustrating a method for processing a callback in a webview, according to one embodiment described herein.

An example of this is shown in FIG. 5, which is a block diagram illustrating a method for processing a callback in a webview, according to one embodiment described herein. As shown, the method 500 begins at step 510, where the URL scheme management component identifies a webview to be displayed. Here, the identified webview includes one or more predefined operations for the universal URL scheme object. Generally, the predefined operations within the webview are written in such a way that they overwrite any subsequently inserted operations having the same name. That is, while the URL scheme management component may generally be configured to include certain default operations, the webview may include predefined operations having the same function names and parameters as these default operations that effectively replace the default operations when the webview is rendered. For example, assume that the host application that will be rendering the webview includes an online store within the application. In such an example, the webview could include a first operation that is a function configured to be called whenever a transaction within the application is approved, and a second operation that is a function configured to be called whenever a transaction within the application is declined.

The URL scheme management component then retrieves data characterizing the URL command scheme used by the application and populates a universal URL scheme object using this data. The populated object is then inserted into the webview with default operations (step 515). For example, the URL scheme management component could insert default operations (e.g., functions) which display or write text indicating the respective default operation was called when executed. For instance, a default operation configured to be called whenever a transaction within the application is declined could write the string "Transaction Declined Function Called" to a log file whenever the default operation is called. Generally, these default operations are inserted so that the operations will still exist in some fashion even when the webview does not overwrite these functions, but in a way that the default operations will be overwritten if the predefined operations already exist within the webview. Thus, because the webview in the depicted example includes predefined operations which overwrite these default operations, when the webview is rendered, the explicitly defined operations already included within the webview will be executed instead of the default operations. In one embodiment, the URL scheme management component is configured to detect that the predefined functions are already present within the webview and, upon detecting their presence within the webview, could avoid overwriting these functions when inserting the populated object into the webview.

Once the populated object is inserted into the webview, the host application renders the webview for display (step 520). At some point, the host application issues a call to one of the predefined functions within the webview (step 525). For example, upon the approval of a transaction created using a store interface within the application, the host application could issue a function call to the predefined operation within the webview for use when a transaction has been approved. The logic within the defined operation is then executed by the host application rendering the webview (step 530), and the method 500 ends. Continuing the above example, once the predefined function associated with an approved transaction is called, the webview could display a "Thank You" message, thanking the user for completed the transaction within the host application. Advantageously, doing so allows for predefined operations to be included in the webview which can subsequently be called by the host application.

In one embodiment, the webview can be configured to dynamically redefine the defined operations during the rendering of the webview. For instance, the webview could be configured to overwrite a first defined operation with a second defined operation upon detecting certain condition(s) are satisfied. As an example, the webview could originally include a first defined operation for rendering a high resolution version of an image. Continuing the example, the webview could be configured to detect when the device rendering the webview switches from a high speed network connection (e.g., a wireless connection) to a lower speed network connection (e.g., a 3G mobile connection), and upon detecting this, could overwrite the first defined operation with a second defined operation for rendering a lower resolution version of the image. In a particular embodiment, the host application rendering the webview may be configured to overwrite particular defined operations within the webview while the webview is being rendered. As an example, the host application could detect that the device running the host application has switched to the lower speed network connection and could overwrite the first defined operation with the second defined operation.

Additionally, as discussed above, the webview could be rendered in such a way that the webview is not displayed to the user. For example, the webview could be rendered in a hidden window or a window that is otherwise not being output for display. For example, a webview configured with a defined operation could be rendered but not displayed by a host application. In such an example, the host application would be able to execute callbacks to the defined operation in order to execute operations associated with the defined operation. Thus, such a webview may be used to provide callback operations for use by the host application, without requiring the host application to display the webview or even for the developer of the webview to implement a graphical interface for the webview.

Figure 6:
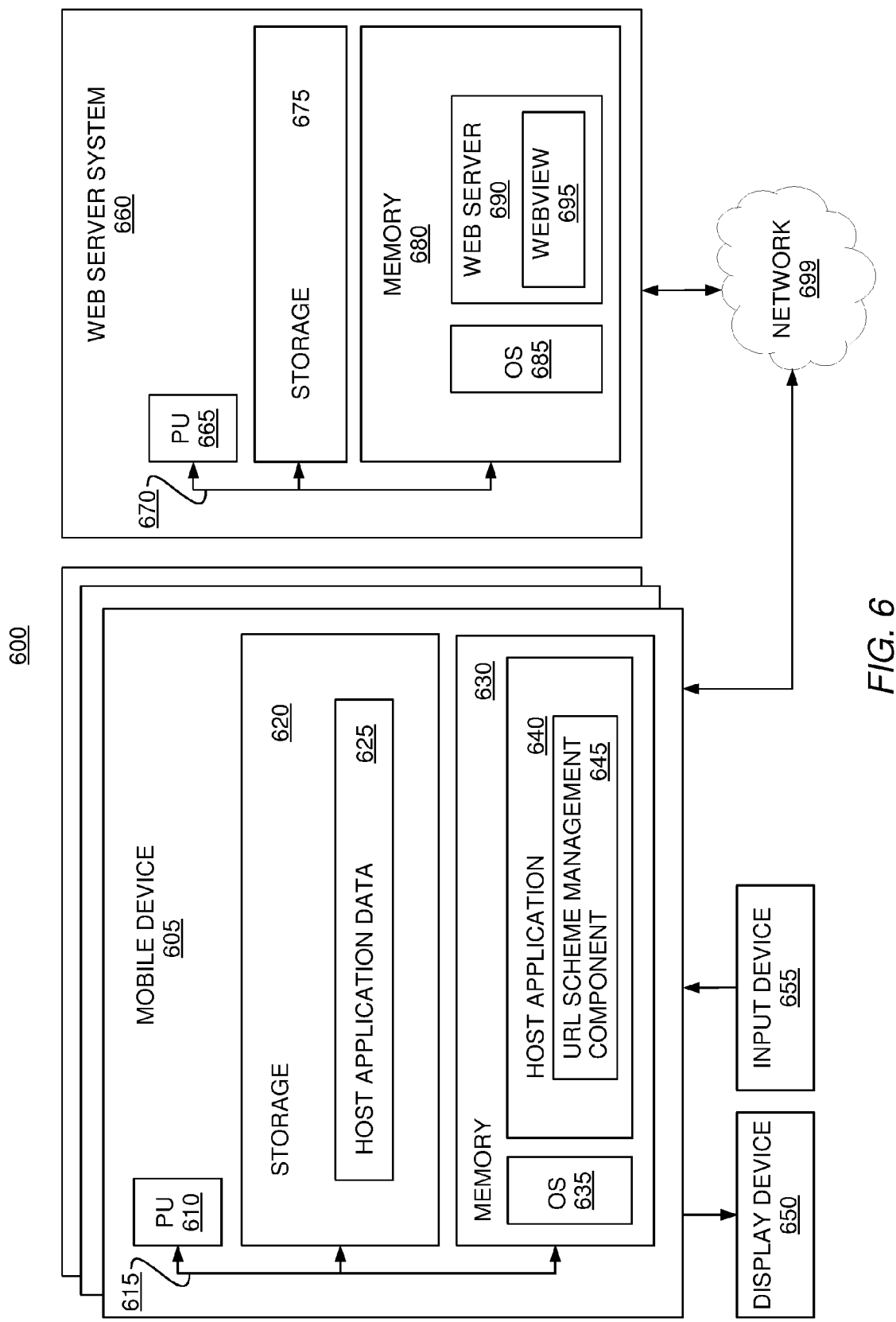
FIG. 6 is a block diagram illustrating an environment configured with a URL scheme management component, according to one embodiment described herein.

FIG. 6 is a block diagram illustrating an environment configured with a URL scheme management component, according to one embodiment described herein. As shown, the system 600 includes a plurality of mobile devices 605 and a web server system 660, communicatively coupled via a network 699. In one embodiment, the mobile devices 605 may include existing computer systems, e.g., desktop computers, server computers, laptop computers, tablet computers, gaming consoles, hand-held gaming devices and the like. The mobile devices 605 illustrated in FIG. 6, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each mobile device 605 includes, without limitation, a processor 610, which obtains instructions and data via a bus 615 from a memory 630 and storage 620. Processor 610 is a programmable logic device that performs instruction, logic, and mathematical processing, and may be representative of one or more CPUs. Storage 620 is representative of hard-disk drives, flash memory devices, optical media and the like. Generally, the storage 620 stores application programs and data for use by the mobile device 605. Of note, although the depicted embodiment includes both storage 620 and memory 630, embodiments may be implemented in systems and devices including only with a memory (e.g., a mobile phone having only Flash memory). Additionally, as shown, the mobile devices 605 are operably connected to the network 699, e.g., via network interfaces.

The memory 630 is any memory sufficiently large to hold the necessary programs and data structures. Memory 630 could be one or a combination of memory devices, including Random Access Memory, nonvolatile or backup memory (e.g., programmable or Flash memories, read-only memories, etc.). In addition, memory 630 and storage 620 may be considered to include memory physically located elsewhere; for example, on another computer coupled to the mobile device 605 via bus 615. The memory 630 includes a host application 640 and an operating system ("OS") 635. Operating system 635 is software used for managing the operation of the mobile device 605. Examples of OS 635 include UNIX, versions of the Microsoft Windows® operating system and distributions of the Linux® operating system. Additional examples of operating system 635 include custom operating systems for gaming consoles, including the custom operating systems for systems such as the Microsoft Xbox 360®, Nintendo WHO and Sony PlayStation® 3. Still other examples of operating system 630 include custom operating systems for mobile devices, such as the Apple® iOS operating system and the Android operating system.

Additionally, the mobile devices 605 each are coupled to display devices 650 and input devices 655. The display devices 650 may include output devices such as monitors, touch screen displays, and so on. For instance, the display devices 650 could include a display device used to visually render a webview for display. As an example, the display 650 may provide a touch sensitive surface allowing the user to select different items within the rendered webview. The input devices 655 represent a wide variety of input devices, including keyboards, mice, controllers, touch screens and so on. Furthermore, the input devices 655 may include a set of buttons, switches or other physical device mechanisms for controlling the mobile devices 605.

As shown, the web server system 660 includes, without limitation, a processor 665, which obtains instructions and data via a bus 670 from a memory 680 and storage 675. Processor 665 is a programmable logic device that performs instruction, logic, and mathematical processing, and may be representative of one or more CPUs. Storage 675 is representative of hard-disk drives, flash memory devices, optical media and the like. Generally, the storage 675 stores application programs and data for use by the web server system 660. The web server system 660 is operably connected to the network 699, e.g., via a network interface.

The memory 680 is any memory sufficiently large to hold the necessary programs and data structures. Memory 680 could be one or a combination of memory devices, including Random Access Memory, nonvolatile or backup memory (e.g., programmable or Flash memories, read-only memories, etc.). In addition, memory 680 and storage 675 may be considered to include memory physically located elsewhere; for example, on another computer coupled to the web server system 660 via bus 670. The memory 680 includes an OS 685, and a web server 690. Operating system 685 is software used for managing the operation of the web server system 660. The web server system 690 in turn includes a webview 695. The webview 695 broadly represents any webview, web page, or other item capable of being rendered for display and managed by a web server, that is configured to interact with the universal URL scheme object. Examples of OS 685 include UNIX, versions of the Microsoft Windows® operating system and distributions of the Linux® operating system. Additional examples of operating system 685 include custom operating systems for gaming consoles, including the custom operating systems for systems such as the Microsoft Xbox 360®, Nintendo Wii® and Sony PlayStation® 3.

As discussed above, the host application 640 could receive the webview 695 for display from the web server 690. Generally, upon receiving the webview 695, the URL scheme management component 645 may be configured to access the host application data 625 and to use this data 625 to populate a universal URL scheme object. For example, if a particular host application 640 is configured to accept the URL "ttr4cmd://launch/store" in order to launch a store interface within the host application 640, the URL scheme management component 645 could insert the string "ttr4cmd://launch/store" into the universal URL scheme object and associate this string with a function within the object associated with launching the store interface. For instance, such a function could be configured to send a request to the URL specified by the string whenever the function is called. The URL scheme management component 645 could then insert the populated object into the received webview 695. The host application 640 may then render the webview 695 for display using the display device 650. Doing so allows the webview 695 to be rendered by a plurality of host applications 640, without the need for the webview 695 to be developed to specifically interact with the respective URL command schemes used by the various host applications 640. Advantageously, this simplifies the development of the webview 695, as the developer can configure the webview 695 to interact with the universal URL scheme object, and the URL scheme management component 645 can insert the host application-specific information into the webview 695 before the webview 695 is rendered for display.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a host application 640 configured with a URL scheme management component 645) or related data available in the cloud. For example, the host application 640 could retrieve a webview from a storage location within the cloud. The URL scheme management component 645 could then populate a universal URL scheme object with application-specific data for the host application 640 and could insert the populated object into the retrieved webview. The webview could then be rendered for display. Doing so allows the webview to be viewed from a computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving, from a remote web server, a webview formatted according to a predefined schema configured for use with a plurality of host applications, the webview including at least one function call to a first function;
    determining, by a first one of the plurality of host applications executing on one or more computer processors, one or more application-specific URL values corresponding to a URL command scheme for the first host application, from a plurality of application-specific URL values for the plurality of host applications;
    populating a URL scheme object with the determined one or more application-specific URL values, wherein the populated URL scheme object includes a function definition for the first function, and wherein the function definition is associated with a first one of the one or more application-specific URL values;
    modifying the received webview by inserting, by the first host application, the populated URL scheme object into the received webview; and
    rendering the webview with the inserted URL scheme object, by the first host application, such that when one of the at least one function calls is made, the function definition in the inserted URL scheme object is executed to transmit a request to the first host application and specifying an address portion of the first application-specific URL value.

2. The method of claim 1, wherein identifying a webview to be displayed further comprises at least one of (i) receiving the webview from a web server and (ii) retrieving the webview from a predetermined storage location.

3. The method of claim 1, wherein the transmitted request includes at least one parameter corresponding to a parameter portion of the first application-specific URL value.

4. The method of claim 1, wherein the webview includes one or more defined operations for the URL scheme object, wherein the populated URL scheme object includes one or more default operations, and wherein the one or more defined operations overwrite the one or more default operations when the webview is rendered.

5. The method of claim 4, further comprising:
    upon rendering the webview for display, receiving a callback request to a first one of the one or more defined operations; and
    processing the callback according to the first defined operation.

6. The method of claim 1, wherein populating the URL scheme object further comprises:
    inserting one or more strings into the URL scheme object, wherein each of the one or more strings corresponds to a URL scheme command recognized by the host application.

7. The method of claim 6, wherein each of the inserted one or more strings is associated with a respective function within the URL scheme object, and wherein the host application is configured to perform one or more operations in response to a call to one of the URL scheme commands.

8. A system, comprising:
    a processor; and
    a memory containing a program that, when executed by the processor, performs an operation, comprising:
        receiving, from a remote web server, a webview formatted according to a predefined schema for use with a plurality of host applications, the webview including at least one function call to a first function;
        determining, by a first one of the plurality of host applications executing on one or more computer processors, one or more application-specific URL values corresponding to a URL command scheme for the first host application, from a plurality of application-specific URL values for the plurality of host applications;
        populating a URL scheme object with the determined one or more application-specific URL values, wherein the populated URL scheme object includes a function definition for the first function, and wherein the function definition is associated with a first one of the one or more application-specific URL values;

modifying the received webview, by the first host application and prior to rendering the webview, by inserting the populated URL scheme object into the received webview; and rendering the webview with the inserted URL scheme object, by the first host application, such that when one of the at least one function calls is made, the function definition in the inserted URL scheme object is executed to transmit a request to the first host application and specifying an address portion of the first application-specific URL value.

9. The system of claim 8, wherein identifying a webview to be displayed further comprises at least one of (i) receiving the webview from a web server and (ii) retrieving the webview from a predetermined storage location.

10. The system of claim 8, wherein the transmitted request includes at least one parameter corresponding to a parameter portion of the first application-specific URL value.

11. The system of claim 8, wherein the webview includes one or more defined operations for the URL scheme object, and wherein inserting the populated URL scheme object does not overwrite the defined operations in the webview.

12. The system of claim 11, the operation further comprising:

upon rendering the webview for display, receiving a callback request to a first one of the one or more defined operations; and processing the callback according to the first defined operation.

13. The system of claim 8, wherein populating the URL scheme object further comprises:

inserting one or more strings into the URL scheme object, wherein each of the one or more strings corresponds to a URL scheme command recognized by the host application.

14. The system of claim 13, wherein each of the inserted one or more strings is associated with a respective function within the URL scheme object, wherein the populated URL scheme object includes one or more default operations, and wherein the one or more defined operations overwrite the one or more default operations when the webview is rendered.

15. A computer program product, comprising:

a non-transitory computer-readable medium having computer readable program code embodied therewith, the computer readable program code comprising:

computer readable program code to receive, from a remote web server, a webview formatted according to a predefined schema configured for use with a plurality of host applications, the webview including at least one function call to a first function;

computer readable program code to determine, by a first one of the plurality of host applications, one or more application-specific URL values corresponding to a URL command scheme for the first host application, from a plurality of application-specific URL values for the plurality of host applications;

computer readable program code to populate a URL scheme object with the determined one or more application-specific URL values, wherein the populated URL scheme object includes a function definition for the first function, and wherein the function definition is associated with a first one of the one or more application-specific URL values;

computer readable program code to modify the received webview by inserting, by the first host application, the populated URL scheme object into the received webview; and computer readable program code to render the webview with the inserted URL scheme object, by the first host application, such that when one of the at least one function calls is made, the function definition in the inserted URL scheme object is executed to transmit a request to the first host application and specifying an address portion of the first application-specific URL value.

16. The computer program product of claim 15, wherein the computer readable program code to identify a webview to be displayed further comprises computer readable program code to perform at least one of (i) receiving the webview from a web server and (ii) retrieving the webview from a predetermined storage location.

17. The computer program product of claim 15, wherein the transmitted request includes at least one parameter corresponding to a parameter portion of the first application-specific URL value.

18. The computer program product of claim 15, wherein the webview includes one or more defined operations for the URL scheme object, wherein the populated URL scheme object includes one or more default operations, and wherein the one or more defined operations overwrite the one or more default operations when the webview is rendered.

19. The computer program product of claim 18, the computer readable program code further comprising:

computer readable program code to, upon rendering the webview for display, receive a callback request to a first one of the one or more defined operations; and computer readable program code to process the callback according to the first defined operation.

20. The computer program product of claim 15, wherein the computer readable program code to populate the URL scheme object further comprises:

computer readable program code to insert one or more strings into the URL scheme object, wherein each of the one or more strings corresponds to a URL scheme command recognized by the host application.

21. The computer program product of claim 20, wherein each of the inserted one or more strings is associated with a respective function within the URL scheme object, and wherein each function is configured to transmit a network message to a URL corresponding to the string associated with the function upon invocation of the function by the webview.

* * * * *